United States Patent [19]

Little

[11] Patent Number: 4,885,716
[45] Date of Patent: Dec. 5, 1989

[54] HIGH SPEED CARRY CHAIN

[75] Inventor: Wendell L. Little, Carrollton, Tex.

[73] Assignee: Dallas Semiconductor Corporation, Dallas, Tex.

[21] Appl. No.: 232,403

[22] Filed: Aug. 15, 1988

[51] Int. Cl.[4] ............................................... G06F 7/50
[52] U.S. Cl. ..................................... 364/786; 364/770
[58] Field of Search ................................ 364/786, 770

[56] References Cited

U.S. PATENT DOCUMENTS

| | | | |
|---|---|---|---|
| 3,947,671 | 3/1976 | Geng et al. | 364/786 |
| 4,152,775 | 5/1979 | Schwartz | 364/786 |
| 4,338,676 | 7/1982 | Briley | 364/786 |
| 4,357,675 | 11/1982 | Freyman | 364/786 |
| 4,563,751 | 1/1986 | Barker | 364/786 |
| 4,623,981 | 11/1986 | Wolrich et al. | 364/736 |
| 4,807,176 | 2/1989 | Yamada et al. | 364/786 |

Primary Examiner—David H. Malzahn
Attorney, Agent, or Firm—Worsham, Forsythe, Sampels & Wooldridge

[57] ABSTRACT

A carry chain includes a plurality of carry latches (20') which are disposed along a carry propagating line (12) to propagate a carry signal to a latch node (18). During precharge of the latch node (18), a precharge transistor (26') pulls the node to a logic one. During the precharge cycle, an N-channel transistor (34) which is a portion of the latch (20') is disconnected from the latch node (18) by a transistor (38). After the precharge cycle, this N-channel transistor (34) is reconnected to the latch node (18). This provides a low source impedance to quickly discharge the associated latch nodes (18) as the carry propagates along the carry chain (12).

29 Claims, 2 Drawing Sheets

HIGH SPEED CARRY CHAIN

BACKGROUND AND SUMMARY OF THE INVENTION

The present invention pertains in general to digital arithmetic circuits, and particularly to integrated circuits which include adder or multiplier blocks with ripple-mode carry architecture.

Digital arithmetic circuits need the capability for fast addition and multiplication. A key point of high-speed addition or multiplication is the carry operation. For example, one of the critical factors in the speed of almost any Digital Signal Processing (DSP) chip is the carry chain in the multiplier. Addition can also be a speed-limiting factor in simpler integrated circuit portions, e.g. in an ALU (arithmetic logic unit) or even in a program counter. Thus, improvements in the speed of the carry operation may have a significant impact on the overall performance of many numeric computing systems.

Several architectures are known for digital adders. See, e.g., U.S. Pat. Nos. 3,947,671, 4,338,676, and 4,623,981, which are hereby incorporated by reference. In such architectures, much of the arithmetic can be performed in parallel, e.g. by separate circuits which sum corresponding bits of the two numbers which are being added together. However, the carry operations are not as amenable to parallel operations. For example, to determine whether a carry-in bit must be added in at the 15th bit position, it is necessary to look at the carry-out result from the 14th bit position; and that result may depend on the carry-out result from the 13th bit position, and so on. For example, if 1 is being added to 1023, these numbers would appear, in 16-bit binary notation, as

```
  0000001111111111   (= 1023)
+ 0000000000000001   (= 1)
  ----------------
  0000010000000000   (= 1024.)
```

In this operation, the carry-in bit value at bit position 11 (where the 1 appears in the number "0000010000000000") is known only after the carry operations have been computed at bit positions 10, 9, 8, 7, 6, 5, 4, 3, 2, and 1. People doing long addition by hand will normally work from the right-most (least significant) digits over to the left-most (most significant), handling carries as they go. However, for computer operations, this would be impossibly slow. Therefore, a primary challenge to any adder architecture is to handle the carry operations rapidly.

The present invention is particularly applicable to systems which use a ripple-mode carry chain architecture. In this architecture, a simple electrical circuit is used to link the carry inputs and outputs of all the one-bit stages. Since all the one-bit stages are "chained" together, this architecture is referred to as a "carry chain" architecture. the propagation of carry information along the electrical circuit is not clocked, so the carry computations can be resolved as fast as the electrical properties of the circuit permit.

Each of the one-bit stages along the carry chain includes logic to use the carry-in bit, and logic to propagate the appropriate carry-out bit along the chain. That is, at a given bit position:

if the operand bits are "0+0", the carry-out bit must be "0", regardless of the carry-in bit;

if the operand bits are "1+1", the carry-out bits must be "1", regardless of the carry-in bit; and if the operand bits are "0+1" or "1+0", the carry-out bit must be the *same* as the carry-in bit, and therefore the carry-in bit can simply be propagated along the chain to the next stage. Note that none of these cases requires any logical operation to be performed on the carry-in bit. Thus, it is possible to perform all of the carry computations asynchronously (ideally, within one clock cycle).

To perform the full add, it is only necessary to: (1) sum the operand bits at all of the stages simultaneously, to obtain a preliminary result bit and a correct setting for the carry propagation logic; (2) propagate the carry signals, and allow enough time for a carry signal to propagate all the way down the carry chain; and (3) modify the preliminary result bit, in accordance with the carry-in bit, to provide a data output bit. If step 2 (the carry propagation) can be done in one clock phase, then the full addition can be performed in only three phases.

The carry propagation logic is implemented using pass gates (which are used to control propagation of the carry-in bit along the carry data line) and latches (which are used to capture the carry-in bit data). The latches will also provide an active load to the carry-in line, since, at each stage where the carry-in bit does not match the latch's state, the transistors in these latches will tend to fight the carry-in bit signal until the latch changes state.

The layout of the carry chain often has to be quite strung out, since the pitch of the carry chain will be determined by the pitch of the preceding stages. For example, in a multiplier, the spacing of the stages in the carry-chain logic might be determined by the pitch of the preceding shift and add blocks. Thus, the distributed capacitance of the carry line may be significant.

Electrically, the carry chain behaves almost like a transmission line: it has a significant distributed series resistance (from the pass gates), and also a large distributed load (current loading from the latch feedback, as well as capacitive loading from the distributed capacitance of the line and the input capacitance of transistor gates.) The delay of such a circuit is dependent on three factors: increased series resistance increases delay; increased loading increases delay; and increased effective length (e.g. from an increased number of stages in the carry chain) increases delay.

As integrated circuits have been scaled, and their operating speeds increased, the electrical delay of the carry chain has become a more significant factor. Note that the delay which must be allowed for in clocking is the worst-case electrical delay, i.e. the electrical delay required to propagate a carry signal all the way through the carry chain. Thus, even if this worst-case delay does not occur very often, it may require adding an additional clock cycle into every operation. Therefore, it would be desirable to increase the speed with which a carry signal propagates along the carry chain.

The present invention provides faster carry chain operations. The circuit features which accomplish this may be considered, electrically, as adding some distributed positive feedback during the time when carry signals may be propagating along the carry chain. (This positive feedback has the effect of decreasing the net loading on the transmission line. The current provided by this positive feedback is of opposite sign to the current sources which load the line initially.)

Within the general context of digital arithmetic circuits using carry chain architectures as described above, the present invention uses different logic at each stage of the carry chain. To clarify some of the advantages resulting from these innovative differences, the circuit configuraton of a conventional carry chain structure will now be described in greater detail.

FIGS. 1 and 2 schematically show a carry chain structure. Each stage has a data latch 16, a carry latch 20, a pass transistor 14, and a precharge transistor 26. Each latch 20 includes two static inverters, coupled back-to-back; the first inverter 24, whose input is connected to the carry line 12, will be referred to here as the "feedforward" inverter, and the second inverter 22, whose input is connected to the output of the first inverter and whose output is connected to the carry line, will be referred to as the "feedback" inverter. While the preceding stages (not shown) are performing arithmetic computations to define a preliminary result bit, the precharge transistors 26 pull up the inputs to each of the latches 20 to the supply voltage. Next, some of the pass transistors 14 are turned on (determined by the preliminary result bit), and the carry signal is propagated down the chain as far as permitted by pass transistors 14. (In FIG. 2 the carry signal is shown as originating in an NMOS transistor 28. In a full adder, each stage must be able to originate a carry signal, but the complete circuitry to do this is not shown in FIG. 2.) After carry propagation has occurred, an XOR circuit (not shown) combines the carry-in bit (from the output of the latches 20) with the preliminary result bit, to define the data-out bit.

Two significant contentions must be considered here. First, when the precharge cycle occurs, the PMOS precharge transistors 26 will have to overpower the NMOS pull-down transistors in the feedback inverters 22 of at least some of the carry latches 20. To facilitate this (and avoid excessive delay or power consumption during the precharge cycle), the pull-down transistors in the feedback inverters 22 are made relatively small. Secondly, if the incoming carry signal is low, it will have to overcome the PMOS pull-up transistor in the feedback inverter 22. Therefore, both of the devices in the second inverter would conventionally be made fairly small.

In the present invention, the carry latch 20' is not a static latch. The feedback inverter 22' is gated, so that it is only active after the precharge cycle. This inverter therefore be used to provide positive feedback onto the carry line.

This change in the operation of the latch 20' is combined with several significant changes in device ratios. First, the pulldown (NMOS) transistor in inverter 22' is made relatively large. Second, the feedforward inverter 24' is given a relatively high threshold voltage, so that the carry latches 20' switch and (begin to strengthen the carry signal) before the voltage on carry line 12 falls very far. Third, the precharge transistor 26 does not have to be made any larger than the layout conveniently permits, since it does not have to fight any active device during precharge.

Another aspect of the innovative teachings contained herein is that the carry latches 20' preferably have asymmetrical switching characteristics. These latches switch very readily from high to low (i.e. when an incoming carry signal is received), but they do not have to switch readily from low to high.

Therefore, when the carry signal is propagating, each latch 20' loads the carry signal (by sourcing current to the carry line) only until that latch's input node has been pulled down to about 3 Volts. At that point, the latch switches, and begins to sink current from the carry line. This current strengthens the carry signal, and helps to pull down the input node of the following stage (if the pass transistor is on).

This circuit organization is useful in several contexts. It provides a compact and fast full adder circuit. It is also useful in a general-purpose arithmetic/logic unit (ALU). In this context, such a carry chain structure is useful to provide the carry capability for rapid addition or subtraction, and can also be used for analogous linkage of stages in other arithmetic operations. This circuit organization is also useful in an incrementer, where an operand is (selectably) incremented or decremented. Such an incrementer is particularly useful in a program counter. In addition, this circuit organization can also be adapted to other hardware for digital arithmetic, or for other algorithms where low-level sequential branching must be performed.

The present invention provides faster performance in microprocessors (and other integrated circuts), by providing faster adder and multiplier circuits. The present invention provides faster carry chain operation in circuits which use ripple-mode carry.

BRIEF DESCRIPTION OF THE DRAWING

The present invention will be described with reference to the accompanying drawings, which show important sample embodiments of the invention and which are incorporated in the specification hereof by reference, wherein.

DESCRIPTION OF THE PREFERRED EMBODIMENTS

The numerous innovative teachings of the present application will be described with particular reference to the presently preferred embodiment, wherein these innovative teachings are advantageously applied to the particular problems of an adder. However, it should be understood that this embodiment is only one example of the many advantageous uses of the innovative teachings herein. In general, statements made in the specification of the present application do not necessarily delimit *any* of the various claimed inventions. Moreover, some statements may apply to some inventive features but not to others.

Figure 1:
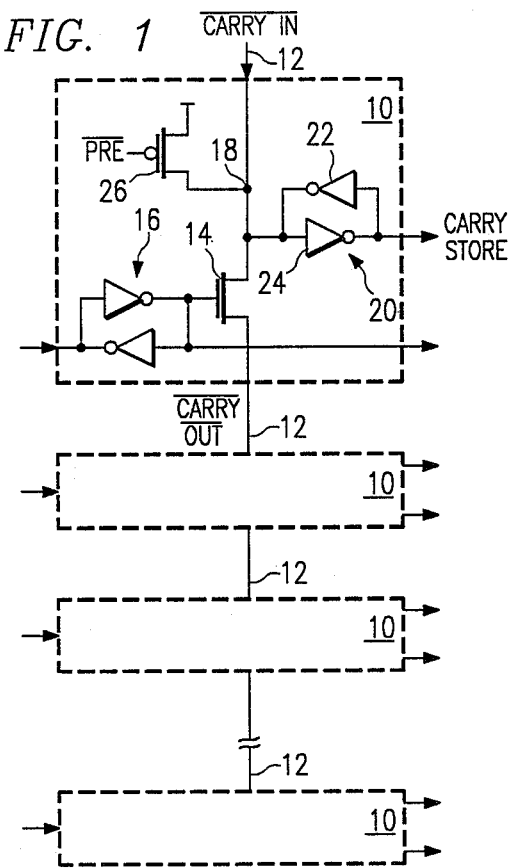
FIG. 1 is a logic diagram of a carry chain.
Figure 2:
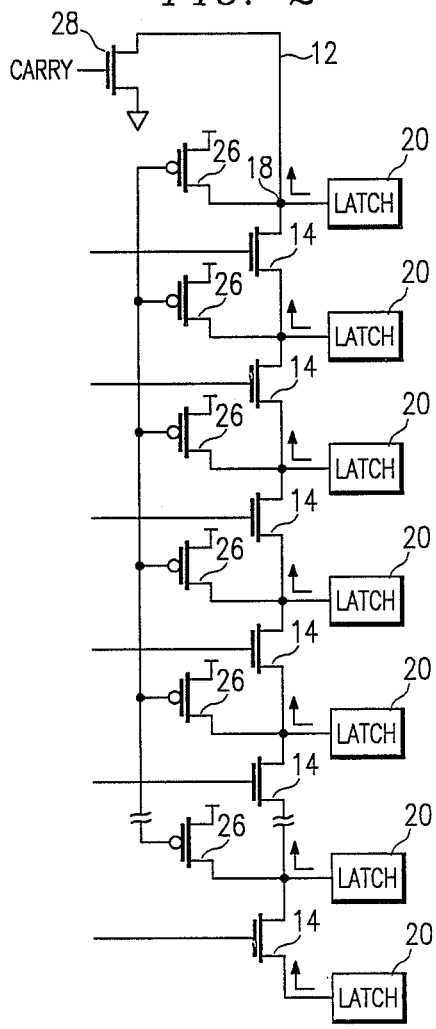
FIG. 2 is a block diagram of a carry chain depicting the propagation of a carry signal through the carry chain.

FIG. 1 shows a schematic block diagram of a carry chain for propagating a carry through an adder or similar circuit. Not all of the details of the adder circuitry are illustrated, since, these are well known in the art. The carry chain comprises a plurality of carry stages 10, each having a carry input, a data input, a carry output, and a data output. A carry line 12 interconnects the carry stages 10 (running from the carry-out of each stage to the carry-in of the next stage). Only one of the carry stages 10 is illustrated in detail.

Each of the carry stages 10 includes an N-channel pass transistor 14, which is connected in series with the line 12 (so that carry propagation can be terminated). The carry line 12 is a long conductive run that has an associated series resistance and an associated distributed capacitance. The gate of transistor 14 is connected to the output of a data latch 16, the input of which is connected to a data-bar line. The data latch 16 stores a preliminary result bit. The output of the data latch 16 is also connected to the data output of the carry stage 10, as will be discussed below.

Each carry stage 10 has a CARRY-IN-bar input, to receive the carry line 12 from the preceding carry stage. (This incoming carry signal is also referred to below as CI-bar. Note that this is complemented signal, so CI-bar is low if the carry-in bit is "1".) Thus, the incoming signal appears on latch node 18. Latch node 18 is connected to the input of a carry latch 20, which comprises back-to-back inverters 22 and 24. Feedforward inverter 24' has its input connected to the latch node 18, and its output provides an (inverted) carry store signal. Feedback inverter 22 has its input connected to the output of the feedforward inverter 24, and its output connected to the latch node 18. The latch node 18 is also connected to the drain of a P-channel precharge transistor 26. The source of transistor 26 is connected to the positive supply voltage, and its gate is connected to a complemented precharge signal PRE-bar. During a precharge cycle, PRE-bar is low and, during an operating cycle wherein a carry chain signal is propagated down the carry chain, PRE-bar is high.

In operation, the latch node 18 for each of the carry stages 10 is precharged to a high voltage by transistor 26, and this high voltage resets the carry latch 20. After a sufficient time to ensure that the state of all of the pass transistors 14 has settled, the carry propagate operation is begun.

At any given stage, if the data-bar signal is high (i.e. if the preliminary result bit is "0"), the pass transistor 14 will be turned off, and the carry signal cannot propagate. If the data-bar signal is low (so that the pass transistor 14 is turned on), and if the CARRY-IN-bar signal is low (to indicate the presence of a carry-in bit), the low voltage CARRY-IN-bar signal can therefore be propagated, to provide a low voltage CARRY-OUT-bar signal on line 12. (This will provide a low voltage CARRY-IN-bar signal to the next of the carry stages 10.) However, in order for this low-voltage signal to propagate, it must discharge each of the latch nodes 18, and toggle each of the associated carry latches 20, in as many stages as it propagates through.

Figure 3:
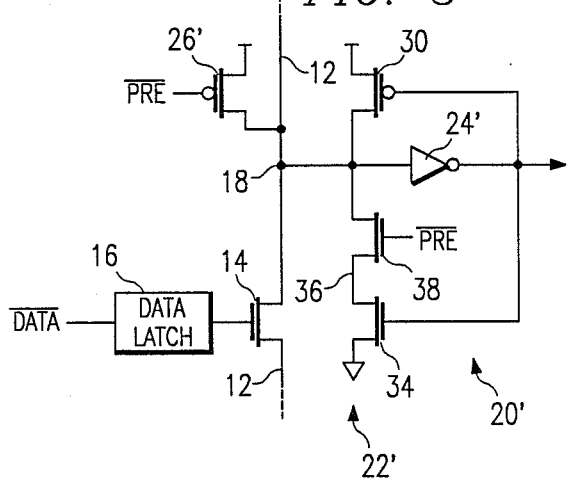
FIG. 3 is a detailed schematic of the carry latch of the present invention.

FIG. 3 is a more detailed schematic of the configuration of latch 20', and of inverters 22' and 24', in the presently preferred embodiment. The inverter 22' comprises PMOS pull-up transistor 30, NMOS driver transistor 34, and NMOS enable transistor 38 which is connected in series with driver transistor 34. The pull-up transistor 30 has its source-to-drain path connected between the positive supply and the latch node 18, with its drain connected to the latch node 18. The gate of the P-channel transistor 30 is connected to the output of latch 20'. The N-channel driver transistor 34 has a source connected to ground, a chain connected to a node 36, and its gate connected to the output of latch 20'. The N-channel enable transistor 38 has its source connected to the node 36 and its drain connected to the latch node 18. The gate of N-channel transistor 38 is connected to the PRE-bar signal. As will be described hereinbelow, the P-channel transistor 30 is a weak transistor that has a relatively high impedance, and as such, it is a small transistor. On the other hand, the N-chanel transistor 34 and the N-channel transistor 38 are stronger transistors, i.e. are large devices that have a relatively low source impedance to provide a rapid discharge of the associated latch node 18.

During operation of the device, the latch node 18 is first precharged high (when signal PRE-bar goes low, turning on P-channel transistor 26'). Therefore, P-channel transistor 26' must source current to the latch node 18. In the prior art device, this current would initially flow to ground through an N-channel transistor in the output of the latch 20'. However, in the present invention, the N-channel transistor 38 is turned off when PRE-bar goes low, and therefore there is no path to ground from latch node 18. Therefore, P-channel transistor 26' need only supply sufficient current to raise the voltage on the input of the inverter 24' to a sufficient level to toggle inverter 24' and turn on P-channel transistor 30. P-channel transistor 30 then assists P-channel transistor 26' in pulling latch node 18 up to supply voltage. In previous devices, the N-channel transistor in inverter 22' was a relatively weak device, so that P-channel transistor 26' could supply sufficient current to overcome this current path to ground. With the present invention, there is no current path to ground during precharge and, therefore, P-channel transistor 26' is not required to provide sufficient current to override a path to ground.

During the carry propagation mode, signal PRE-bar is high, and enable transistor 38 is turned on. N-channel transistor 34 is therefore connected at its drain to latch node 18. When latch node 18 is pulled sufficiently low to raise the output of inverter 24' above the $V_T$ of N-channel transistor 34, N-channel transistor 34 turns on and pulls latch node 18 to ground. Since N-channel transistor 34 is a large transistor, it has high on-state conductance, and therefore provides a low impedance current source, to quickly discharge the capacitance associated with latch node 18. Therefore, the enable transistor 38 provides a switch that allows for a relatively large N-channel device with a low source impedance to be provided during the carry propagation mode, but removes this low source impedance from the latch node 18 during the precharge cycle. This enables the carry-in signal to be propagated down the chain at a higher speed.

Although the foregoing description generally focuses on one stage at a time, it should be noted that the process of discharging node 18 and switching latch 20' is not a sequence of discontinuous steps. If pass transistor 14 is on, a low voltage CARRY-IN-bar signal will have to sink current not only from latch node 18, but also from the latch node 18 of the *next* carry stage, since the potential of the two nodes 18 will differ only by the (fairly small) ohmic voltage drop caused by the series resistance of transistor 14 and the intervening length of carry line 12.

Therefore, a carry is propagated along the chain until a carry stage 10 having a data-bar input that is high is reached. Each of the carry stages 10 has its carry store and data out lines connected to an exclusive OR circuit (not shown) to output the result therefrom.

Figure 4:
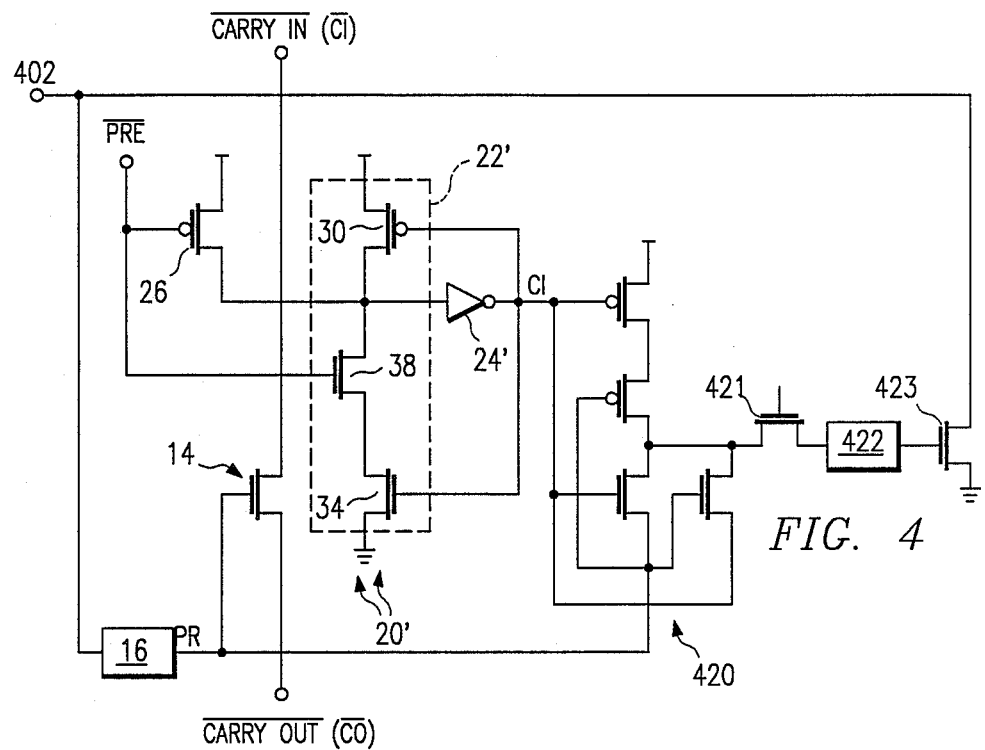
FIG. 4 schematically shows an example of an incrementer circuit, used in a program counter, according to the present invention.

FIG. 4 shows a sample embodiment of key portions of a program counter, using innovative circuit techniques described above. The circuit shown provides an incrementer, rather than a full adder. Note that the number to be incremented may be loaded in from local bus 402.

Since this embodiment is merely an incrementer, there is only one operand, and the preliminary result bit PR is simply equal to the data bit of the operand. This permits the operation of the carry chain logic can be seen with particular clarity. In any given carry stage, if the corresponding operand bit is "1", then the carry-out bit is equal to the carry-in bit, so the pass transistor 14 is turned on to propagate the carry signal. However, if the operand bit is "0", then, the carry-out bit must be "0", regardless of the carry-in bit. To generate the increment, a transistor simply pulls down the CARRY-IN-bar line at the input to the first carry stage. Thus, in this circuit, it is *never* necesary to start a carry in one of the carry stages.

In this circuit, the preliminary result bit PR (which is the gate signal on pass transistor 14) is simply equal to the operand bit. Thus, the operand bit will be loaded into data latch 16 from local bus 402. (Local bus 402 carries inverted data, so the output of data latch 16 will be the true operand data.) The output of data latch 16, and the carry store output of carry latch 20', are connected to XOR logic 420. The output of XOR logic 420 is complemented, so the output of following latch 422 represents a true XOR. That is, this output will be low ("0") if the carry-in bit and the operand data bit are both "1" or both "0", but will be high ("1") otherwise. This output gates NMOS transistor 423, to provide inverted output data signals on local bus 402.

In the presently preferred implementation of the incrementer shown in FIG. 4 with 3 microns nominal minimum length, some nominal device dimensions are as follows. (Due to scaling, actual dimensions will be about 20% less than nominal dimensions.)

PMOS precharge transistor 26: width 9 microns, length 3 microns.

NMOS Pass transistor 14: width 35 microns, length 3 microns.

PMOS pull-up transistor 30: width 4.5 microns, length 11 microns.

NMOS driver transistor 34: width 9 microns, length 3 microns.

NMOS enable transistor 38: width 9 microns, length 3 microns.

Inverter 24': PMOS devices 18 microns wide NMOS devices 9 microns wide.

These device dimensions include some unusual ratios. Circuit elements where an NMOS pass gate is followed by a latch are quite commonly used in CMOS design. (For example, one such configuration is shown, in FIG. 4, by the pass gate 421 before latch 422.) In this standard configuration, the NMOS pass gate is well able to pull down the latch input, to change it from high to low. However, when the latch input is low and the incoming signal is high, the NMOS pass gate introduces a $V_T$ drop, so it is more difficult to pull the latch input high. To compensate for this, such configurations skew the device ratios in the feedforward inverter of the latch, to make it easier to turn on the pull-down device. Thus, latches in such a confguration will typically have PMOS channel widths of only about half the NMOS channel width. (For example, the feedforward inverter in latch 16 has 12 microns PMOS devices, and 24 micron NMOS devices. In the feedforward inverter of latch 422, the PMOS devices are 9 microns wide, and the NMOS devices are 18 microns wide.) By contrast, in a simple logic gate, such as XOR logic 420, the PMOS devices would be about two or 2.5 times the width of the NMOS devices, to compensate for the difference in mobility.

It may be seen that the carry latch 20' also follows an NMOS pass gate, namely the pass gate 14 of the preceding stage. However, the width ratios of the PMOS and NMOS devices in feedforward inverter 24' are not the normal 0.5:1 which would normally be used after an NMOS pass gate. Instead, in this embodiment, the ratio is 2:1. The PMOS channel width is 18 microns, and the NMOS channel width is 9 microns.

These unusual PMOS/NMOS ratios are chosen to shift the effective threshold voltage of inverter stage 24' to be about 0.5 V to 1 V higher than that which would othewise be used. In the presently preferred embodiment, where the power supply voltage is 5 V, and a threshold of about 2 Volts would normally be used for a latch following an NMOS pass gate, the inverter 24' is preferably given a threshold voltage in the range of about 2.5 to 3 Volts.

Figure 5:
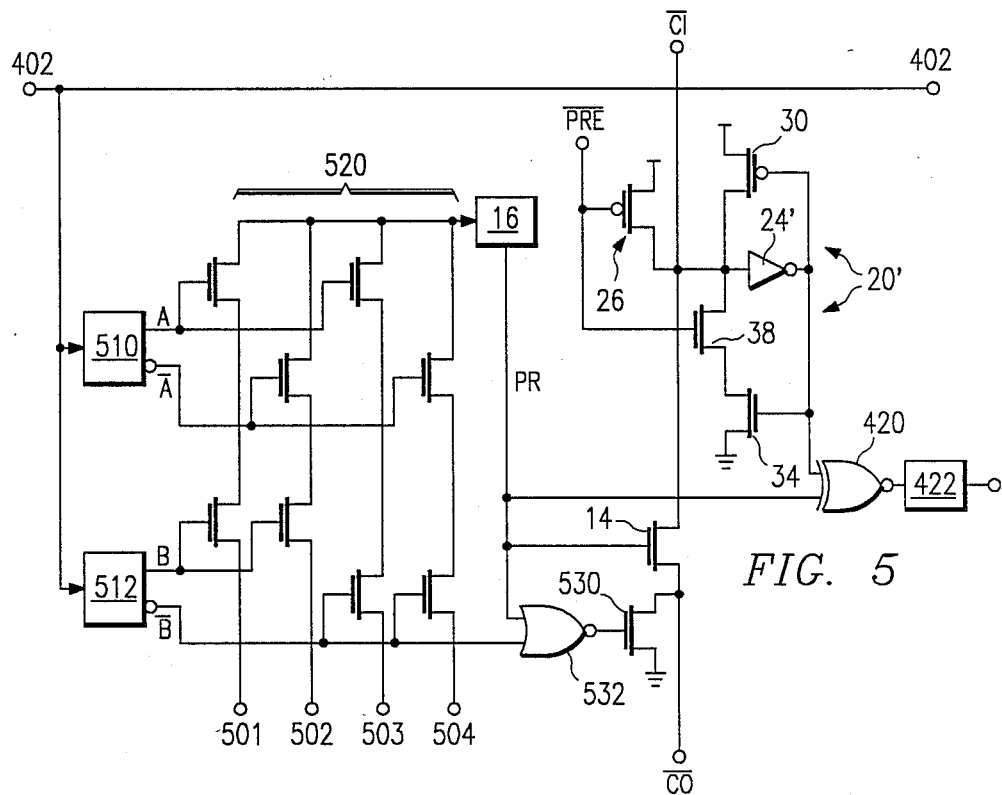
FIG. 5 schematically shows an example of an ALU block according to the present invention.

FIG. 5 shows some key portions of an innovative ALU structure which uses the innovative teachings of the present application.

The block shown in FIG. 5 will be discussed in its operation as an adder, to show key features of the invention. However, it should be noted that this is actually a general-purpose ALU block, which can perform a wide variety of other functions as well.

In FIG. 5, as in FIG. 4, a local bus 402 carries data. As in FIG. 4, the operation of this circuit will be discussed in the case where this bus carries complemented data. (In the presently preferred system embodiment, the local data bus in the ALU is actually used to carry true data. However, this difference does not significantly change the operation of the circuit.) Data from bus 402 (or from other lines not separately shown) can be transferred into a first operand latch 510, or a second operand latch 512. The outputs of these latches provide the true operand values, written for convenience as "A" and "B".

Combination logic 520 provides a wire-ORed combination of two-term products of inputs A, B, and their complements, as selected by control inputs 501 through 504. To perform addition, control lines 501 and 504 are held high, and control lines 502 and 503 are held low. Thus, the input to data latch 16 will be high only if A and B are both high or both low, so the output of latch 16 (which is the preliminary result bit, written here as signal PR) is the XOR of A and B.

The preliminary result bit PR controls pass transistor 14, and is also provided as an input to NOR gate 532. The complement of operand bit A is also provided as an input to NOR gate 532. Thus, the output of gate 432, which is connected to control pull-down transistor 530, is logically equal to the AND combination of A and B. Thus, pull-down transistor 530 will initiate a carry signal whenever A and B are both "1". The pull-down transistor 530 is preferably quite large, since it may have to drive a number of stages in a carry chain. In the presently preferred embodiment (with dimensions scaled as discussed above), this transistor has a nominal width of 35 microns.

If A and B are both "0", pass transistor 14 and pull-down transistor 530 will remain off. The carry latch input at the following stage will therefore remain high after the precharge stage, indicating that no carry signal is incoming.

If only one of A and B is "1", signal PR will be high, so that transistor 14 will be turned on and pull-down transistor 530 will be turned off. This means that the incoming carry signal will be propagated unchanged.

The operation of the remaining elements is generally analogous to those discussed above with reference to FIG. 4. Corresponding elements have been given corresponding reference numerals.

If a very wide structure is needed (e.g. a 64-bit full adder), a carry chain, as described above, can be used in sections. That is, it might be desirable not to propagate the carry all the way through, but to use some additional structure (such as elements derived from look-ahead carry logic) to combine multiple carry chains like that just described. While this is not preferred, this might be a viable alternative embodiment.

The specific embodiments above all use an active low on the carry line. However, those skilled in the art will recognize that it would be quite possible instead to adapt the teachings herein to a circuit where the carry line logic used an active high instead.

Of course, the present invention can also be applied to multipliers (or to other arithmetic hardware), to provide improved carry chain performance.

Although the presently preferred embodiment uses CMOS technology, it will also be recognized by those skilled in the art that the innovative teachings set forth herein could also be applied to other device technologies, such as bipolar logic.

As will be recognized by those skilled in the art, the innovative concepts described in the present application can be modified and varied over a tremendous range of applications, and accordingly their scope is not limited except by the allowed claims.

What is claimed is:

1. A digital arithmetic circuit, comprising:
   a plurality of arithmetic logic circuit blocks connected, substantially in parallel, to each perform a predetermined operation on respective bits of one or more operands and to each provide a respective preliminary result bit accordingly; and
   a plurality of carry chain stages connected in series along a carry line, wherein ones of said stages are each connected to receive said preliminary result bit from a respective one of said arithmetic logic blocks, and each include:
     a precharge device, connected to precharge said carry line to a first voltage;
     a pass transistor, connected to selectably connect or disconnect said carry line through said stage; and
     a carry latch, having an input connected to said carry line, wherein said carry latch is connected to be at least partially disabled whenever said precharge device is turned on; and
   a plurality of data output logic stages, each connected to combine an output of a respective one of said carry latches with said respective preliminary result bit of a corresponding one of said arithmetic logic circuit blocks.

2. The arithmetic circuit of claim 1, wherein said carry latch has a threshold voltage which is closer to said first voltage than to a supply voltage level.

3. The arithmetic circuit of claim 1, wherein said carry latch comprises first and second back-to-back inverters, said first inverter having an input connected to said carry line, and said second inverter having an input connected to the output of said first inverter and an output connected to said input of said first inverter, and wherein said second inverter is connected to be disabled whenever said precharge device is turned on.

4. The arithmetic circuit of claim 1, wherein said carry latch comprises first and second back-to-back inverters, said first inverter having an input connected to said carry line, and said second inverter having an input connected to the output of said first inverter and an output connected to said input of said first inverter, and wherein said second inverter includes an enable device which has the opposite conductivity type from said precharge device.

5. The arithmetic circuit of claim 1, wherein said precharge device is connected to precharge said carry line to approximately an upper supply voltage level, and wherein the presence of a carry bit is indicated by a low voltage on said carry line.

6. The arithmetic circuit of claim 1, wherein said pass transistor is connected to be turned on only if said preliminary result bit is a "1".

7. The arithmetic circuit of claim 1, wherein said pecharge device is connected to precharge said carry line to approximately an upper supply voltage level, and wherein the presence of a carry bit is indicated by a low voltage on said carry line, and wherein said carry latch has a threshold voltage which is more than 50% of said first voltage.

8. The arithmetic circuit of claim 1, wherein said respective stages each comprise a carry generation device, connected to selectably generate a carry-out signal on said carry line even if said pass transistor is turned off.

9. An arithmetic/logic unit (ALU), comprising a plurality of stages, wherein plural ones of said stages each comprise:
   a first operand data latch, connected to hold a first electrical signal corresponding to a first operand;
   a second operand data latch, connected to hold a second electrical signal corresponding to a second operand;
   a programmable logic gate, which receives said first operand data bit and sad second operand data bit and performs an operation on said first and second data bits in accordance with an operation specifier signal, to provide at least one preliminary result bit; and
   a carry chain stage, connected to receive said preliminary result bit, wherein plural ones of said carry chain stages are connected in series along a carry line, and wherein each said carry chain stage includes
     a carry latch, comprising first and second back-to-back inverters, said first inverter having an input connected to said carry line and said second inverter having an input connected to the output of said first inverter and an output connected to said input of said first inverter, and
     a precharge device, connected to precharge the input of said carry latch to a precharge logic state during a precharge cycle, and
   a plurality of data output logic stages, each connected to combine an output of a respective one of said carry latches with said respective data from the corresponding one of said programmable logic gates, wherein said second inverter of said carry latch is disabled during said precharge cycle, and inclues a low-impedance device connected to drive said carry line away from said precharge state if said carry line begins to depart from said precharge state.

10. The ALU of claim 9, wherein said carry latch hs a threshold device which is closer to the voltage of said precharge logic state than to the voltage accessed by said low-impedance device.

11. The ALU of claim 9, wherein said second inverter includes an enable device which has the opposite conductivity type from said prechage device.

12. The ALU of claim 9, wherein said precharge logic state is approximately equal to an upper supply voltage, and wherein said low-impedance device is connected to conditionally drive said carry line toward ground.

13. An adder, comprising:
a plurality of addition circuit blocks, connected, in parallel, to each sum respective bits of two or more operands, and to each provide a corresponding preliminary result bit to a respective carry chain stage,
wherein plural ones of said carry chain stages are connected in series along a carry line and wherein ones of said carry chain stages each include
a carry latch, comprising first and second back-to-back inverters, said first inverter having an input connected to said carry line, and said second inverter having an input connected to the output of said first inverter and an output connected to said input of said first inverter,
a precharge device, connected to precharge the input of said carry latch to a precharge logic state during a precharge cycle, and
a plurality of data output logic stages, each connected to combine an output of a respective one of said carry latches with said respective preliminary result bit of a corresponding one of said addition circuit blocks to define an output bit;
wherein said second inverter of aid carry latch is disabled during said precharge cycle, and includes a low-impedance device connected to drive said carry line away from said precharge state if said carry line begins to depart from said precharge state.

14. The adder of claim 13, wherein said carry latch has a threshold device which is closer to the voltage of said precharge logic state than to the voltage accessed by said low-impedance device.

15. The adder of claim 13, wherein said second inverter includes an enable device which has the opposite conductivity type from said precharge device.

16. The adder of claim 13, wherein said precharge logic state is approximately equal to an upper supply voltage, and wherein said low-impedance device is connected to conditionally drive said carry line toward ground.

17. An incrementer, comprising,
a plurality of operand latches, connected in parallel to hold respective bits of an operand;
a plurality of carry chain stages connected in series along a carry line, wherein one of said carry chain stages each include
a carry latch, comprising first and second back-to-back inverters, said first inverter having an input connected to said carry line, and said second inverter having an input connected to the output of said first inverter and an putout connected to said input of said first inverter;
a precharge device, connected to precharge the input of said carry latch to a precharge logic state during a precharge cycle, and
a plurality of data output logic stages, each connected to combine an output of a respective one of said carry latches with said respective preliminary result bit of a corresponding one of said arithmetic logic circuit blocks to define an output bit;
wherein said second inverter of said carry latch is disabled during said precharge cycle, and includes a low-impedance device connected to drive said carry line away from said precharge state if said carry line begins to depart from said precharge state;
and wherein, to increment said operand, an electrical signal indicating a carry-in bit of "1" is provided to the one of said carry stages which is connected to the one of said operand latches which receives the least significant bit of said operand.

18. The incrementer of claim 17, wherein said carry latch has a threshold device which is closer to the voltage of said precharge logic state than to the voltage accessed by said low-impedance device.

19. The incrementer of claim 17, wherein said second inverter includes an enable device which has the opposite conductivity type from said precharge device.

20. The incrementer of claim 17, wherein said precharge logic state is approximately equal to an upper supply voltage, and wherein said low-impedance device is connected to conditionally drive said carry line toward ground.

21. A carry chain circuit, comprising:
a plurality of carry latches, each associated with a data bit, and arranged in a sequential order corresponding to said respective associated data bits, each of said carry latches being connected to store a received signal which may correspond to a carry logic state or to another state which is logically opposite to said carry logic state;
at least one precharge device, connected to precharge the inputs of said carry latches to a precharge logic state during a precharge cycle, said precharge logic state being opposite to the logic state of said carry logic state;
logic connected to conditionally propagate a signal corresponding to said carry logic state to each of said carry latches in said sequential order during a carry propagating cycle, such that the carry logic state is propagated to one of said carry latches if the preceding one of said carry latches in said sequential order has said carry logic state propagated thereto and the associated data bit of said preceding carry latch indicates that carry operation is enabled; and
means, connected to the respective inputs of ones of said carry latches, for providing a low impedance between the input of the ones of said carry latches that said carry logic state is propagated to and a voltage representative of said carry logic state.

22. The carry chain of claim 21, wherein said carry logic state comprises a low logic state and said precharge logic state comprises a high logic state.

23. The carry chain of claim 21, wherein said precharge means comprises a P-channel transistor associated with each of said carry latches on the input thereof for connecting the input of the associated one of said carry latches to positive supply voltage during said precharge cycle.

24. The carry chain of claim 21, wherein each of said carry latches comprises:
   first and second inverters connected in a back-to-back configuration;
   said first inverter having the input thereof connected to the input of said carry latch and the output thereof connected to the output of said carry latch, and
   said second inverter having the input thereof connected to the output of said carry latch and the output thereof connected to the input of said carry latch.

25. The carry chain of claim 21, wherein said low impedance comprises a discharge transistor having the source-to-drain path thereof connected between the output of said second inverter and said voltage representative of said carry logic state during said carry propagating cycle to provide a low source impedance.

26. The carry chain of claim 21, wherein each of said carry latches comprises first and second inverters connected in a back-to-back configuration, said first inverter having the input thereof connected to the input of said carry latch and the output thereof connected to the output of said carry latch, and said second inverter has the input thereof connected to the output of said carry latch and the output thereof connected to the input of said carry latch, and said low impedance comprises a discharge transistor having the source-to-drain path thereof connected between the output of said second inverter and said voltage representative of said carry logic state during said carry propagating cycle, and said discharge transistor has a wider channel than the corresponding transistor of said first inverter.

27. The carry chain of claim 21, wherein each of said carry latches comprises first and second inverters connected in a back-to-back configuration, said first inverter having the input thereof connected to the input of said carry latch and the output thereof connected to the output of said carry latch, and said second inverter has the input thereof connected to the output of said carry latch and the output thereof connected to the input of said carry latch, and wherein said second inverter comprises:
   a first transistor connected between the output of said second inverter and a voltage representative of said precharge logic state and operable to conduct when the input of said associated carry latch is disposed at said precharge logic state by said precharge means;
   said low impedance is connected between the output of said second inverter and said voltage representative of said carry logic state such that said low impedance conducts only during said propagating mode when the input of said associated carry latch goes from said precharge logic state to said carry logic state.

28. The carry chain of claim 21, wherein each of said carry latches comprises first and second inverters connected in a back-to-back configuration, said first inverter having the input thereof connected to the input of said carry latch and the output thereof connected to the output of said carry latch, and said second inverter has the input thereof connected to the output of said carry latch and the output thereof connected to the input of said carry latch, and wherein said second inverter comprises a first transistor connected between the output of said second inverter and a voltage representative of said precharge logic state and operable to conduct when the input of said associated carry latch is disposed at said precharge logic state by said precharge means, and said low impedance is connected between the output of said second inverter and said voltage representative of said carry logic state such that said low impedance conducts only during said propagating mode when the input of said associated carry latch goes from said precharge logic state to said carry logic state;
   and wherein said carry logic state is a low logic state and said first transistor comprises a P-channel transistor in said second inverter and said low impedance is provided by:
      a first N-channel transistor having a low source impedance and operable to inhibit conduction during said precharge cycle;
      a second N-channel transistor having the gate thereof connected to the output of said first inverter;
      said first and second N-channel transistors having the source-to-drain paths thereof connected in series between the input of said second inverter and a low reference voltage and operable to conduct only during said carry propagation cycle when the input to said associated carry latch goes from said precharge logic state to said carry logic state.

29. The carry chain of claim 21, wherein each of said carry latches has the input thereof connected to a latch node associated and said means for propagating comprises:
   a plurality of field-effect transistors, each associated with one of said data bits and having the source-to-drain path thereof connected in series between two adjacent ones of said latch nodes and the gate thereof connected to the associated one of said data bits and operable to conduct when said associated data bit is at a predetermined data logic state, said predetermined data logic state indicating a carry operation in the presence of said carry signal propagated to the associated one of said latch nodes, wherein said series connected transistors are operable to propagate a carry signal.

* * * * *